United States Patent
LeBlanc et al.

(10) Patent No.: US 6,209,774 B1
(45) Date of Patent: Apr. 3, 2001

(54) METHOD OF SPRAY BRAZING AUTOMOTIVE ASSEMBLIES

(75) Inventors: John LeBlanc; Mark Simpson; Anthony J. Osborne, all of Brampton; Ron Moore, Limehouse, all of (CA)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/534,697

(22) Filed: Mar. 24, 2000

(51) Int. Cl.[7] .............................. B23K 1/14; B23K 31/02
(52) U.S. Cl. .............................................. 228/102; 228/261
(58) Field of Search .................................... 228/102, 261, 228/11, 32; 219/162, 76.1, 85.1; 427/421, 424; 118/680, 696

(56) References Cited

U.S. PATENT DOCUMENTS

| | | |
|---|---|---|
| 3,829,017 | 8/1974 | Napor et al. . |
| 3,991,927 | 11/1976 | Napor et al. . |
| 4,084,847 | 4/1978 | Kondo et al. . |
| 4,224,501 | 9/1980 | Lindbom et al. . |
| 4,373,657 | 2/1983 | Fillon . |
| 4,568,816 | 2/1986 | Casler, Jr. . |
| 4,613,743 * | 9/1986 | Nied et al. . |
| 4,675,502 | 6/1987 | Haefner et al. . |
| 4,883,938 * | 11/1989 | Sarugaku . |
| 5,014,183 | 5/1991 | Carpenter et al. . |
| 5,130,515 | 7/1992 | Toyoda et al. . |
| 5,460,653 * | 10/1995 | Otani et al. . |
| 5,603,853 * | 2/1997 | Mombo-Caristan . |
| 5,614,254 * | 3/1997 | Murata et al. . |
| 5,622,752 * | 4/1997 | Erickson et al. . |
| 5,841,104 * | 11/1998 | Svensson . |
| 5,901,897 | 5/1999 | Takahashi et al. . |

* cited by examiner

Primary Examiner—Clifford C. Shaw
Assistant Examiner—Jonathan Johnson
(74) Attorney, Agent, or Firm—Lawrence J. Shurupoff

(57) ABSTRACT

A method of using a robot to repeatedly manipulate a brazing nozzle is provided. In a preferred embodiment, the method includes using a pointer to teach the robot to manipulate the brazing nozzle at a preselected angle with respect to, and length away from, an instant surface along a multi-dimensional seam line on an automotive sheet metal body. The pointer includes a base portion for connection with an end of a robot arm. The pointer additionally has a main body having a length inclusive of the base portion approximating the length of the brazing nozzle and the preselected work distance of the brazing nozzle away from the work piece. A contact portion of the pointer is continuous with the main body and is provided for contacting the work piece. The contact portion has two small parallel-spaced surface flats. The surface flats of the contact portion are generally aligned in a common plane at a preselected angle with respect to the robot arm. The flats allow the programming of the robot to follow a multi-dimensional path which is generally parallel with respect to the seam line. After programming, the brazing nozzle is connected with the robot arm and is manipulated to braze the automotive body in lines generally parallel-spaced from the seam line or diagonally between lines parallel-spaced from the seam line.

5 Claims, 3 Drawing Sheets

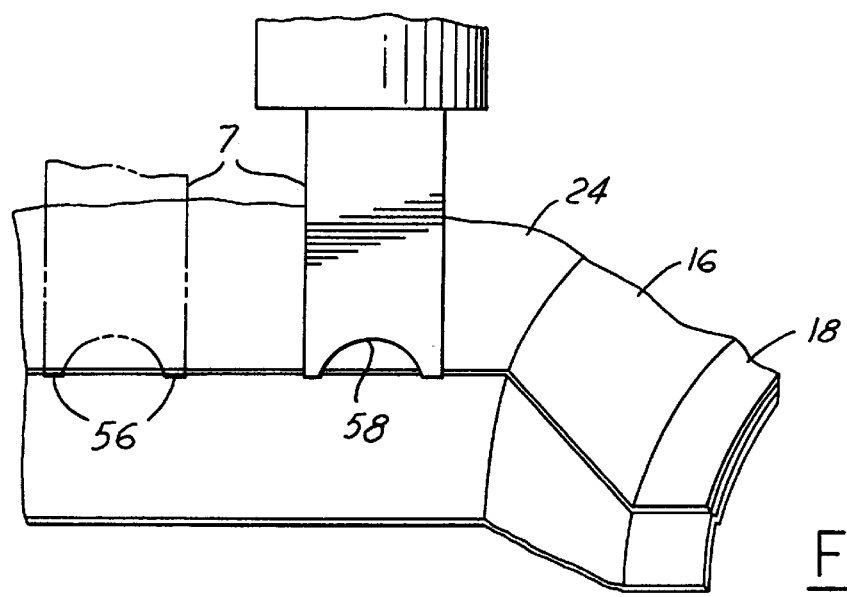
FIG. 5
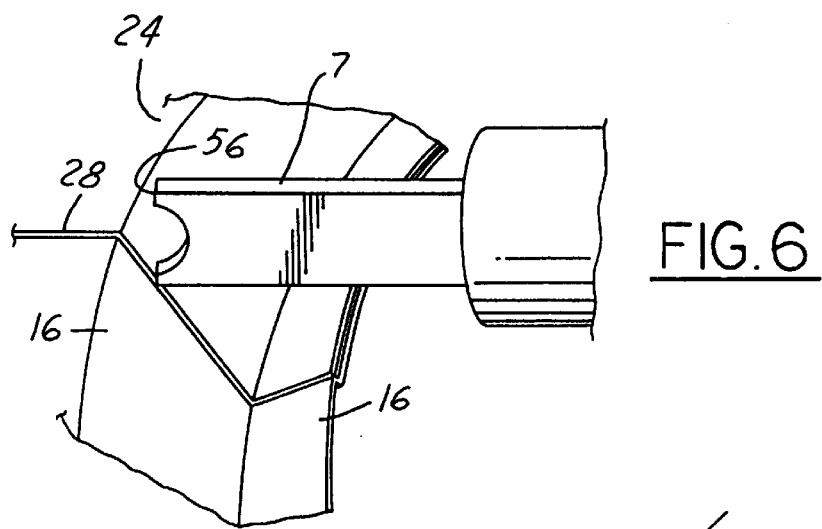
FIG. 6
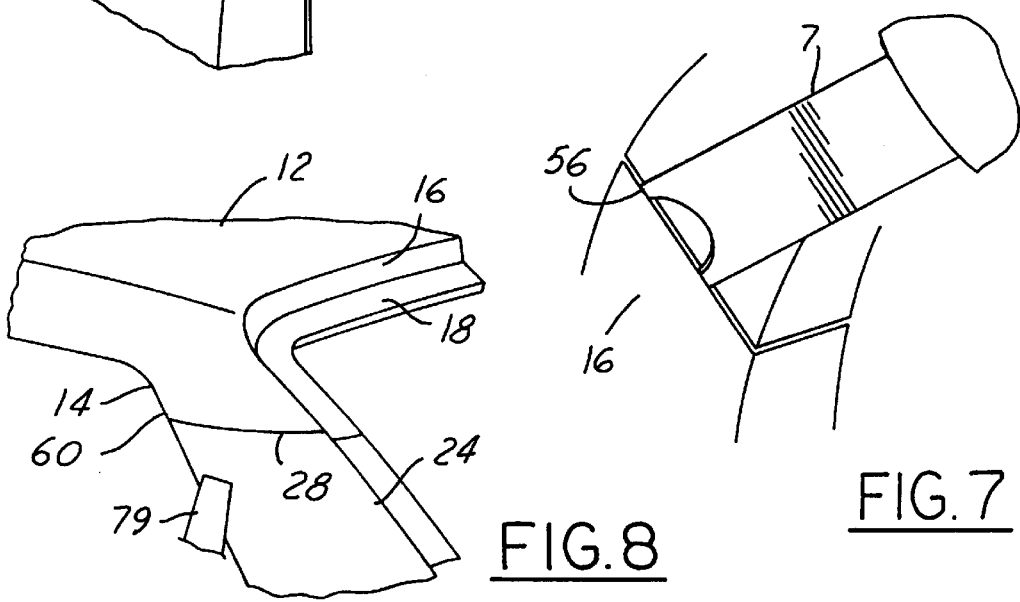
FIG. 8
FIG. 7

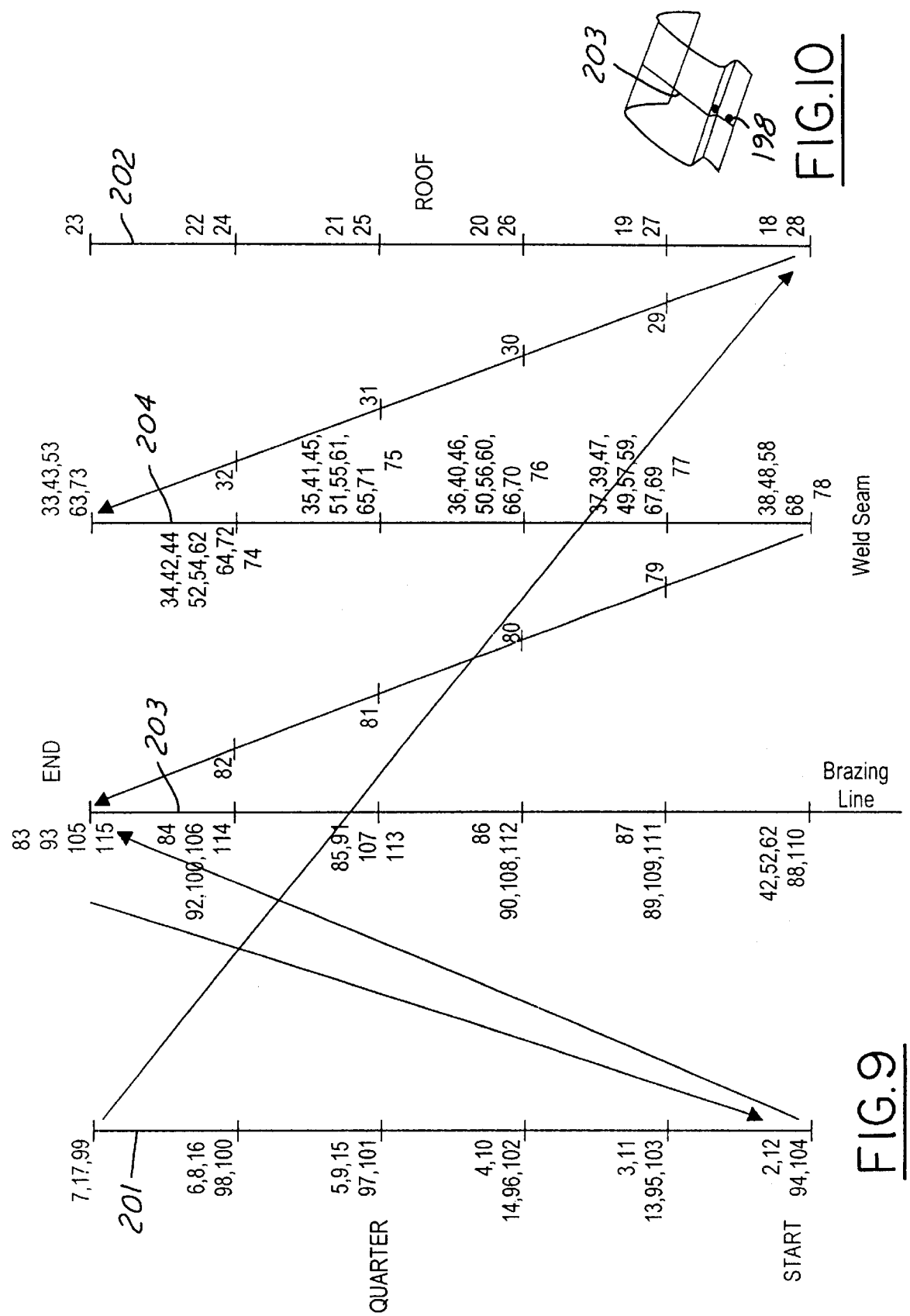

METHOD OF SPRAY BRAZING AUTOMOTIVE ASSEMBLIES

FIELD OF THE INVENTION

The field of the present invention is that of a method for robotically brazing a multi-dimensional sheet metal seam on an automotive vehicle body.

BACKGROUND OF THE INVENTION

Most automotive vehicles have a roof. The roof of the automotive vehicle is typically joined to the remainder of the car body by at least a pair of transversely-spaced front and rear pillars. The front pillar which is adjacent to the windshield is referred to as the A pillar. The rear pillar, which is adjacent to the rear window opening, is typically referred to as the C pillar. The C pillar's outer body is formed from two large sheet metal stampings. The first stamping is the roof panel and the second stamping is a rear quarter panel. The roof panel has an integral portion forming a depression for placement of the rear glass window pane and for forming an upper portion of the C pillar. The roof panel portion of the C pillar is typically placed in an over-lapping manner in connection with the C pillar portion of the rear quarter panel. The rear quarter panel also has a depression for the rear window pane. The rear quarter panel additionally forms the rear door opening and the rear side panel of the vehicle.

The two body panels of the C pillar are fitted and welded together. The C pillar can have an irregular surface appearance at the seam line due to gaps in fit up and/or distortion from the heat of the welding. For aesthetic reasons, it is typically desired that the C pillar appear to be one continuously-formed piece of sheet metal. To cover up the seam overlap, head distortion and/or gaps in fit up between the roof panel C pillar portion and the quarter panel C pillar portion, brazing is typically applied. After the brazing solidifies, a grinder is applied to smooth out the brazing to provide a smooth transition between the sheet metal of the C pillar which is integral with the roof panel and the sheet metal which is integral with the rear quarter panel. After the grinding operation and subsequent painting of the vehicle, the seam line between the two sheet metal portions of the C pillar becomes virtually indistinguishable.

In the most recent two decades efforts have been made to utilize robots to perform the brazing operation (sometimes referred to as soldering). A device, typically referred to as a brazing nozzle, is utilized to project liquefied silicon brazing material onto the C pillar. On most vehicles, the C pillar has surface curvatures in the fore and aft direction, in the transverse direction and in the vertical direction of the vehicle. Accordingly, the brazing nozzle at the end of the robot must follow a complex multi-dimensional path and should be maintained at a perpendicular orientation with respect to the surface of the C pillar. Additionally, the brazing nozzle should be positioned at a constant distance from the surface of the C pillar to provide an even disposition of brazing and to prevent excessive heat transfer to the C pillar which could inadvertently warp or damage the sheet metal of the C pillar. Empirical experience has shown that the complex geometrical shapes of the C pillar make a purely mathematical modeling of the path of the robot to be unworkable. Accordingly, a teach tool is utilized to program the robot. When using a teach tool an operator will physically manipulate the robot in the desired path of operation. The motion imparted to the robot will be transferred to its controller and the robot will "memorize" the path followed by the teach tool. Thereafter the robot can repeatedly follow the prescribed path.

Prior to the present invention, a rod-like pointer was used as the teach tool for the robot. When using a rod pointer to teach the robot, sometimes the operator inadvertently would not have the pointer perpendicular to the instant surface of the C pillar, which resulted in several problems when the robot was using the brazing nozzle to braze the C pillar. Whenever the pointer was not perpendicular to the surface, the distance from the brazing nozzle to the surface of the C pillar would not be constant. A non-constant distance causes the brazing to be misapplied and can sometimes inadvertently cause the sheet metal of the C pillar to be overexposed to heat and accordingly warp or bend. To compensate for the lack of constant distance, typically an excess amount of brazing was applied. The excess amount of brazing was undesirable because additional brazing time caused an increase in production time, which mandated additional production time for the grinding operation to smooth out the brazing.

It is desirable to provide a method of robotically brazing a resetting multi-dimensional panel seam line on a resetting automotive body C pillar while at the same time keeping a brazing nozzle at a constant angle with respect to the C pillar. It is desirable to provide a method of robotically brazing a resetting multi-dimensional panel seam line on a resetting automotive body C pillar while at the same time keeping a brazing nozzle at a constant distance away from the surface of the C pillar.

SUMMARY OF THE INVENTION

To make manifest, the above-noted desires, the revelation of the present invention is brought forth. In a preferred embodiment, the present invention provides a method of brazing a seam line between two automotive vehicle body panels. The method includes the use of a pointer to teach a robot to repeatedly manipulate an end-of-arm tool such as a brazing nozzle having a predetermined length along a multi-dimensional seam line on a resetting work piece as provided by a C pillar of an automotive vehicle body. The pointer is utilized to teach the robot to keep the brazing nozzle at a generally perpendicular work angle and at a pre-selected work distance away from the instant surface of the C pillar along the multi-dimensional path. The pointer includes a base portion connecting the pointer with an end of a robot arm. A main body having an elongated form with a generally rectangular cross-section is connected with the base portion. The main body has a length inclusive of the base approximating the predetermined length of the brazing nozzle and the pre-selected desired work distance of the brazing nozzle away from the surface of the C pillar. A contact portion, which is continuous and integral with the main body, is provided for contacting the C pillar. The contact portion has two small parallel spaced surface flats that are generally aligned in a common plane perpendicular with respect to the robot arm. The flats are separated by a window cut out to allow an operator to visually inspect the instant surface of the C pillar juxtaposed by the flats.

It is an object of the present invention to provide a method of brazing a seam line in an automotive body utilizing a pointer to teach a robot to repeatedly manipulate an end-of-arm tool such as a brazing nozzle at a constant angle with respect to an instant surface of a three-dimensional object along a multi-dimensional work path.

The above-noted objects of the present invention will become apparent to those skilled in the art from a review of the invention as it is provided in the accompanying drawings and detailed description.

BRIEF DESCRIPTION OF THE DRAWINGS

FIG. 5 is an operative view of the pointer being utilized in teaching the robot to proceed along the seam of the C pillar.

FIG. 6 is an operational view similar to that of FIG. 5 illustrating a position of the pointer to allow the operator to realize that the robot is in an improper position with respect to an instant surface of the C pillar.

FIG. 7 is a view similar to that of FIG. 5 illustrating the use of the pointer of the present invention for programming the robot for travel of the brazing nozzle when brazing the portion of the seam between the roof panel and the quarter panel wherein a depression is made to accept the rear window glass pane.

FIG. 8 is a view similar to FIG. 2 illustrating a robot manipulating a brazing nozzle to braze a driver side C pillar on an automotive vehicle body utilizing the method of the present invention.

FIG. 9 is a half control diagram for the manipulation of the brazing nozzle by the robot for the brazing operation on a passenger side C pillar.

FIG. 10 is a small schematic view of the passenger side C pillar illustrating the rear door opening flange main C pillar body.

DETAILED DESCRIPTION OF THE INVENTION

Figure 1:
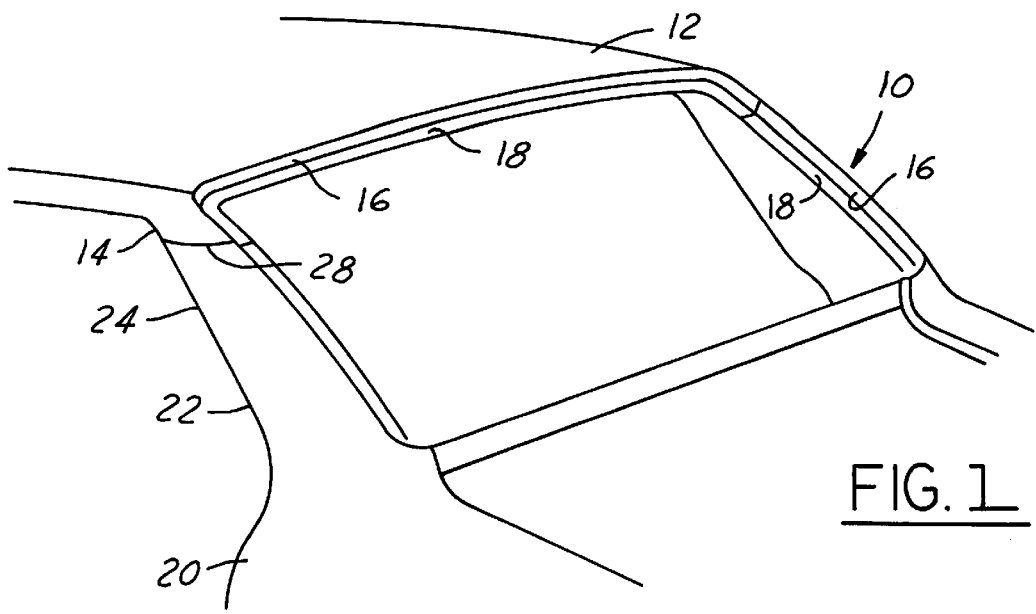
FIG. 1 is a perspective view of an automotive vehicle body illustrating a C pillar that includes extensions of a roof panel and a rear quarter panel.
Figure 2:
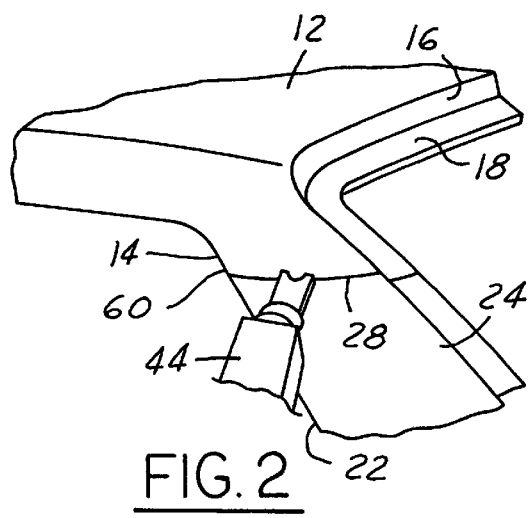
FIG. 2 illustrates a preferred embodiment pointer according to the present invention being utilized on a seam between the rear quarter portion of the C pillar and the overlapping C pillar portion of the roof panel.
Figure 3:
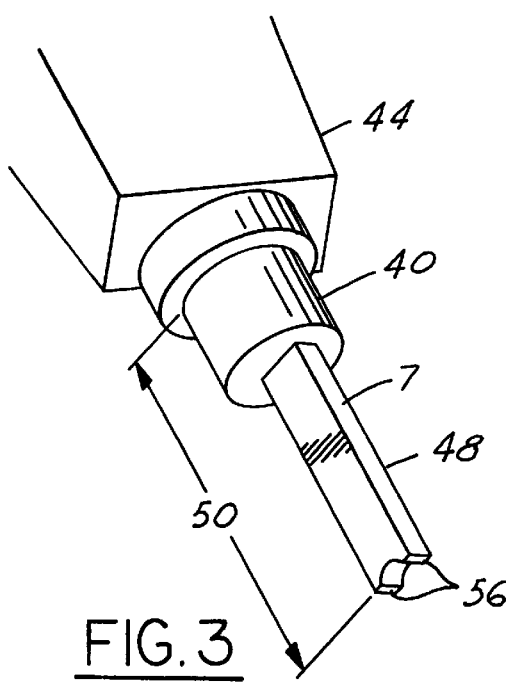
FIG. 3 is a perspective view of the pointer of the present invention.
Figure 4:
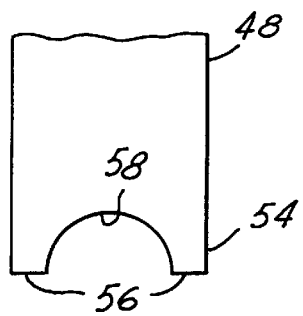
FIG. 4 is a partial front elevational view of the pointer shown in FIGS. 2 and 3.

Referring to FIGS. 1 and 2, a work piece utilized with the present invention is provided by an automotive vehicle body 10. The automotive vehicle body 10 is positionally reset by a conveyor belt or an automatic guided vehicle. The automotive vehicle body 10 has a roof panel stamping 12. The roof panel at the extreme rear end has an integral extension 14. Stamped into the roof panel is a depression having a side surface 16 which abuts an edge of the rear window glass pane (not shown) and a window glass support surface 18. Also forming part of the car body 10 is a rear quarter panel 20. The rear quarter panel forms the rear side of the vehicle. The rear quarter panel 20 has an extension 22. The roof panel extension 14 and the rear quarter extension 22 combine to form the sheet metal of the C pillar 24. In a manner similar to the extension 14, the rear quarter panel extension 22 has a glass depression formed by side member 16 and a glass support 18.

The extension 14 of the roof panel overlaps the extension 22 of the rear quarter panel by approximately 15 mm. The C pillar has a curvature in the fore and aft direction of the vehicle and in the transverse direction of the vehicle. Additionally, the C pillar will often have a slight curvature in the vertical direction. Accordingly, the seam line 28 is a complex multi-dimensional path.

Referring additionally to FIGS. 3–7, to aid in the teaching of the robot in programming a path for a brazing nozzle, there is provided a pointer 7. The pointer 7 has a base portion 40. The pointer base portion 40 is provided to connect the pointer 7 with an end of a robotic arm 44. A main body 48 of the pointer is connected with the base portion 40. The main body 48 has a length 50 inclusive of the base portion approximating a pre-selected length of the brazing nozzle end of arm tool and the pre-selected desired work distance of the brazing tool from an instant surface of the C pillar. The main body 48 shown in the embodiment of FIGS. 2–8 has an elongated form with a generally rectangular cross-section.

The pointer 7 has a contact portion 54 that is continuous and integral with the main body 48. The contact portion 54 is provided for contacting the surface of the C pillar 24. The contact portion 54 has two parallel-spaced surface flats 56. The surface flats 56 are generally aligned with each other in a common plane perpendicular with respect to the robot arm 44. In an embodiment not shown, the flats 56 can be at an alternative angle with respect to the robot arm such as but not limited to 85 or 30 degrees. To allow an operator to visually inspect an instant portion of the surface of the C pillar, which is juxtaposed by the flats 56 there is provided a window cut out 58. In the embodiment shown, the window cut out 58 is a semi-circle however, other cut out shapes may be utilized.

Referring to FIG. 7, the schematic view is shown which illustrates the path of the pointer 7 in an area of the C pillar adjacent to the seam line 28. A section of the seam line 28 is provided along the rear door opening 60 of the C pillar. The seam line 28 also proceeds along the out board surface 62 of the C pillar. The seam line 28 proceeds to the window glass depression formed by the side surface 16 and the glass support 18. Along the seam 28 there are various robotic programmable work points 72 which are preprogrammed into the work path which is adjacent to the seam 28. The robot may be programmed to selectively turn off the brazing nozzle or pause to prevent excessive heat or brazing material along certain work points 72. The robot will have multiple passes adjacent to the seam 28 however, only the programming for one pass is being shown.

FIGS. 2, 5 and 6 show an operational view of the pointer 7 being moved by an operator to program the path for the robot. The flats 56 are placed in contact with the surface of the C pillar 24. The contact of the flats 56 with the surface of the C pillar 24 ensures that the pointer 7 is perpendicular to the surface. The cut out window 58 allows the operator programming the robot to see the instant portion of the surface of the C pillar 24 that is juxtaposed by the flats 56. When one of the flats 56 is lifted away from the surface of the C pillar 24 (FIG. 6), the operator will immediately realize that the robot path is improperly programmed in that the length of the brazing nozzle away from the surface, or the angular orientation of the brazing nozzle with respect to the surface, is improper. The need for complex instrumentation is eliminated since the operator can instantly realize that the flats 56 are not in contact with the surface of the C pillar 24. FIG. 6 illustrates the proper orientation of the pointer 7 with the side surface 16 of the window depression, as in FIG. 5. The flats 56 of the pointer 7 are in contact with the surface of the C pillar 24, so that the brazing nozzle will be at the correct orientation and distance away from the C pillar 24. If desired, the main body 48 of the pointer 7 can be made transparent to aid in viewing the surface while the pointer is being utilized to program the robot.

Referring additionally to FIG. 8, a brazing nozzle 79 is connected with a robot (not shown) to braze the driver's side C pillar 24. As previously mentioned, the pointer 7 is utilized to teach the robot to manipulate the brazing nozzle 79 to braze the multi-dimensional seam line 28 between the roof panel C pillar portion 14 and the rear quarter panel C pillar portion 22. The first line or work path begins at a position of the C pillar underneath the seam line 28 upon the quarter panel.

Referring to FIGS. 9 and 10 in regard to the passenger side C pillar 24, the robot moves along line 201 from a start on the door opening flange 198 (FIG. 10) to work points 2, 3, 4, 5, 6 and 7. The brazing nozzle 79 will move diagonally from work point 17 which is at an extreme end of line 201 to work point 18 which is at an extreme end of line 202. Line 202 is generally parallel-spaced from the seam line 28 that corresponds to line 203. From point 18 the brazing nozzle 79 will traverse to points 19 through 23. At point 23 the brazing nozzle will shut off allowing the sheet metal of the C pillar to cool. The brazing nozzle will then reverse along line 202 to work point 28. From work point 28 the robot will move the brazing nozzle 79 to work point 33 on line 204 which is generally parallel-spaced with respect to lines 202 and 203. The brazing nozzle 79 will then be turned on and the robot will manipulate the brazing nozzle 79 between work points 33 and 38 then back through 38 to 43 then again from 43 to 48 reversing back from 48 to 53, from 53 back to 58, from 58 back up to 63. The brazing nozzle 79 is turned off at work point 68 and then is reversed to work point 73 and then is again reversed to work point 78, then is moved diagonally to an extreme end of line 203 to work point 83 where it is again turned on. From work point 83 the robot traverses the brazing nozzle 79 to work point 88 wherein the brazing nozzle 79 is turned off. From point 88 the robot reverses the brazing nozzle 79 to work point 91 ending the pause. The brazing is then again turned on and brazing occurs between work point 91 to 93 where it is again paused. The robot manipulates the brazing nozzle diagonally from work point 93 to work point 94. From work point 94 the robot manipulates the brazing nozzle to work point 99. The brazing nozzle is then reversed to work point 104. The robot then moves the brazing nozzle diagonally from work point 104 to work point 105. The brazing nozzle is moved from work point 105 to work point 110 and then reversed to work point 113 where it is again turned on. From work point 113 it remains on until work point 115. The lines 201, 203, 204 and 202 are approximately 15 millimeters away from each other and the various work points are typically at 25 millimeter increments. Maximum robot speed is typically 300 millimeters per second with a total spray time of approximately 25 seconds. In an alternate embodiment, the spray nozzle is in the on position when moving laterally from point 28 to point 33.

The present inventive brazing method has been shown in preferred embodiments. However, it is apparent to those skilled the art that various modifications can be made to the present invention without departing from the spirit or scope of the present invention as it is encompassed in the specification and drawings and by the following claims.

We claim:

1. A method of robotically manipulating a brazing nozzle to braze a multi-dimensional curvilinear seam line between a roof panel portion and a rear quarter panel portion of C-pillar body panels of a resetting automotive vehicle body at a generally perpendicular work angle and at a pre-selected work distance away from an instant surface of said C pillar body panels adjacent said curvilinear multi-dimensional seam line, said method comprising:

brazing a first line generally parallel spaced from said seam line; and brazing a second line generally parallel spaced from said first and seam lines; and wherein said robot traverses one of said lines along a plurality of brazing work points on said line a plurality of times when brazing said line.

2. A method as described in claim 1 wherein in addition said robot brazes said panels on a diagonal line connecting different lines.

3. A method as described in claim 2 wherein said diagonal line connects opposite extreme ends of said different lines.

4. A method as described in claim 1, wherein said robot is programmed to pause the brazing operation along work points of at least one of said lines.

5. A method as described in claim 1, additionally having at least a third line.

* * * * *